(12) United States Patent
White et al.

(10) Patent No.: US 12,654,288 B2
(45) Date of Patent: Jun. 16, 2026

(54) SAFETY VALVE FOR A PNEUMATICALLY ACTUATABLE TOOL

(71) Applicant: Oetiker Schweiz AG, Horgen (CH)

(72) Inventors: Brett Richard White, Colden, NY (US); Gabriel Schuster, Lachen (CH); Peter Steiner, Alpthal (CH); Pascal Moser, Hausen am Albis (CH)

(73) Assignee: Oetiker Schweiz AG, Horgen (CH)

( * ) Notice: Subject to any disclaimer, the term of this patent is extended or adjusted under 35 U.S.C. 154(b) by 443 days.

(21) Appl. No.: 18/275,230

(22) PCT Filed: Jan. 28, 2022

(86) PCT No.: PCT/EP2022/052043

§ 371 (c)(1),
(2) Date: Aug. 1, 2023

(87) PCT Pub. No.: WO2022/171459

PCT Pub. Date: Aug. 18, 2022

(65) Prior Publication Data

US 2024/0149402 A1 May 9, 2024

(30) Foreign Application Priority Data

Feb. 9, 2021 (DE) ..................... 10 2021 103 015.3

(51) Int. Cl.
*F16K 3/26* (2006.01)
*B25B 5/06* (2006.01)
(Continued)

(52) U.S. Cl.
CPC .............. *B25B 7/126* (2013.01); *B25B 5/064* (2013.01); *B25F 5/021* (2013.01); *F16K 3/26* (2013.01);
(Continued)

(58) Field of Classification Search
CPC ....... Y10T 137/8663; Y10T 137/86702; Y10T 137/86694; Y10T 137/86622;
(Continued)

(56) References Cited

U.S. PATENT DOCUMENTS 1,825,290 A * 9/1931 Stevens ..................... F16K 3/26
91/394
1,850,879 A * 3/1932 Hunt ....................... F16K 3/265
251/149.9
(Continued)

FOREIGN PATENT DOCUMENTS

DE 1503020 A1 10/1969
DE 8900250 U 2/1989
(Continued)

OTHER PUBLICATIONS

English Tranlation of International Search Report of PCT/EP2022/052043, filed Jan. 28, 2022. Mailing Date of Search Report, May 16, 2022.
(Continued)

*Primary Examiner* — Matthew W Jellett
(74) *Attorney, Agent, or Firm* — David L. Nocilly; Bond Schoeneck & King PLLC

(57) ABSTRACT

The invention relates to a pneumatic tool with a handle (26), valve (22), a safety switch lever (18) arranged on the handle (26) for actuating the valve (22) and a pressure medium connection (16), wherein the valve (22) comprises a valve body (28) movable between a home position and at least one further position, wherein a connection between the pressure medium connection (16) and a pressure cylinder (12) of the tool is interrupted in the home position and the connection between the pressure medium connection (16) and the pressure cylinder (12) of the tool is established in the further position. It is proposed that the pressure cylinder (12) is vented with the displacement of the valve body (28) to the (Continued)

Figure 1:
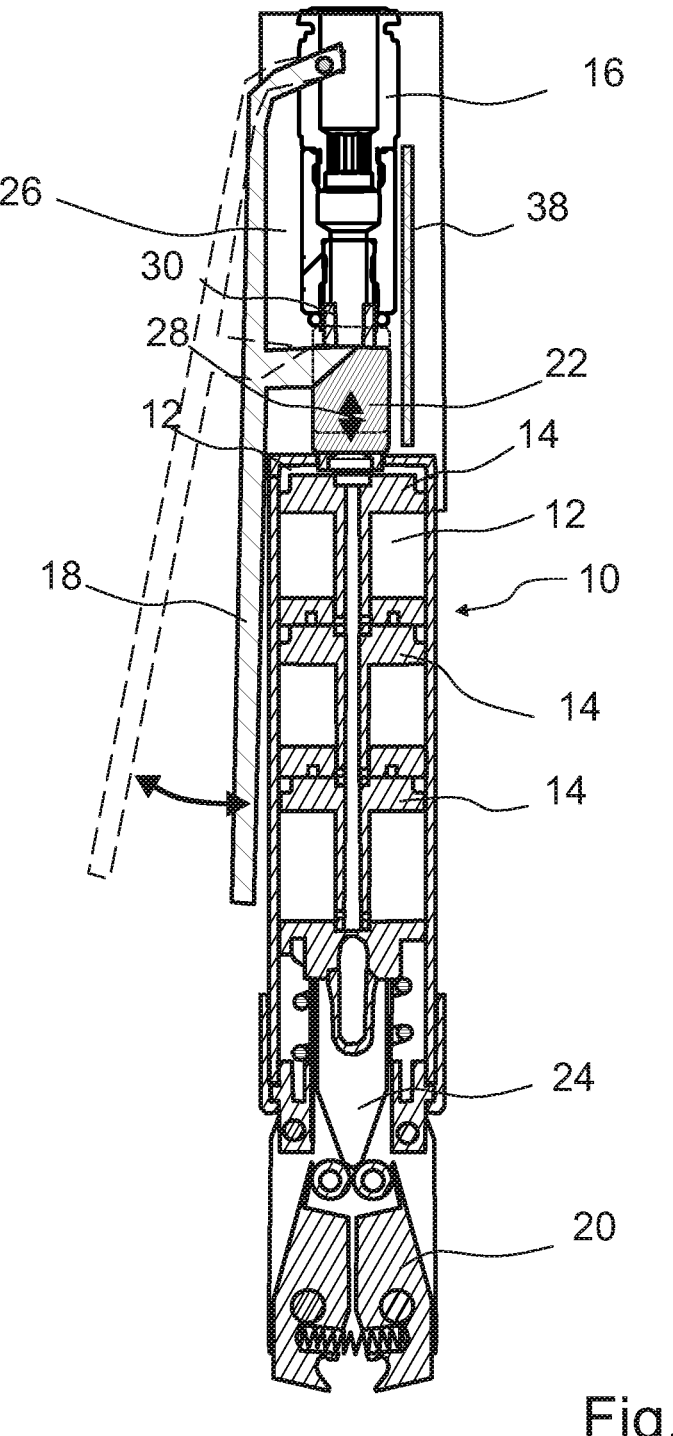

home position and a pressure applied to the pressure medium connection (16) displaces the valve body (28) toward the home position when the safety switch lever (18) is released.

9 Claims, 5 Drawing Sheets

(51) Int. Cl.

| | |
|---|---|
| *B25B 7/12* | (2006.01) |
| *B25F 5/02* | (2006.01) |
| *F16K 31/122* | (2006.01) |
| *F16K 31/143* | (2006.01) |

(52) U.S. Cl.
CPC .............. *F16K 3/262* (2013.01); *F16K 3/265* (2013.01); *F16K 31/1221* (2013.01); *F16K 31/1225* (2013.01); *F16K 31/143* (2013.01); *Y10T 137/8663* (2015.04); *Y10T 137/86702* (2015.04); *Y10T 137/87225* (2015.04)

(58) Field of Classification Search
CPC ..... Y10T 137/87225; Y10T 137/87217; B25B 7/126; B25B 5/064; B25B 27/146; B25F 5/021; H01R 43/0427; F16K 3/265; F16K 3/262; F16K 3/26; F16K 31/1221; F16K 31/122; F16K 31/1226; F16K 31/1225; F16K 31/1223; F16K 31/143; F16K 31/14
See application file for complete search history.

(56) References Cited

U.S. PATENT DOCUMENTS

| | | | | |
|---|---|---|---|---|
| 1,874,858 | A | * | 8/1932 | Beckwith .............. F02M 19/01 |
| | | | | 137/410 |
| 1,944,739 | A | * | 1/1934 | Hunt ...................... F16L 37/46 |
| | | | | 137/625.68 |
| 2,071,204 | A | * | 2/1937 | Hunt ...................... F16K 3/265 |
| | | | | 137/625.68 |
| 2,505,410 | A | * | 4/1950 | Klaas ..................... F16K 3/265 |
| | | | | 137/625.68 |
| 3,641,656 | A | * | 2/1972 | Langas ................ H01R 43/045 |
| | | | | 29/243.57 |
| 4,856,756 | A | * | 8/1989 | Combs .................... F16K 3/26 |
| | | | | 166/332.6 |
| 5,433,410 | A | * | 7/1995 | Foltz ......................... F16K 3/26 |
| | | | | 251/351 |
| 6,317,970 | B1 | * | 11/2001 | Leistner ................ B25B 27/146 |
| | | | | 29/816 |
| 2004/0031839 | A1 | | 2/2004 | Pruyne |
| 2014/0283932 | A1 | * | 9/2014 | Hua ........................ F16K 31/60 |
| | | | | 137/560 |
| 2025/0187155 | A1 | * | 6/2025 | Heller ................... B65B 13/305 |

FOREIGN PATENT DOCUMENTS

| | | | |
|---|---|---|---|
| DE | 3742782 | A | 7/1989 |
| DE | 9111366 | U | 12/1991 |
| DE | 29509976 | U | 8/1995 |
| DE | 19519543 | A1 | 11/1996 |
| EP | 1163979 | A1 | 2/1964 |

OTHER PUBLICATIONS

Non-translated International Search Report and Written Opinion. pp. 1-12.

* cited by examiner

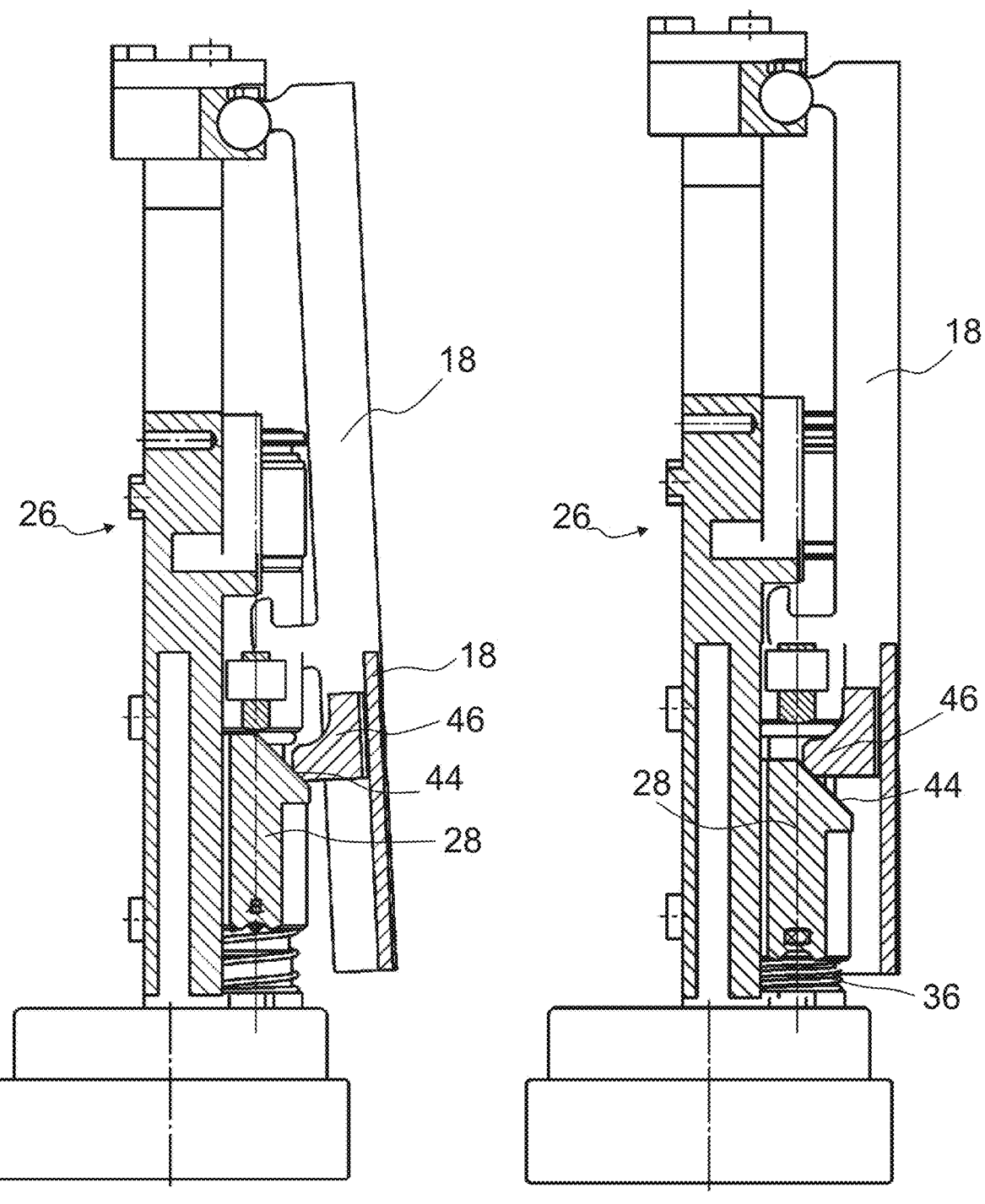
Fig. 5a                   Fig. 5b

SAFETY VALVE FOR A PNEUMATICALLY ACTUATABLE TOOL

CROSS-REFERENCE TO RELATED APPLICATIONS

The present application is a US national stage application of International Application No. PCT/EP2022/052043, filed on Jan. 28, 2022.

The invention relates to a pneumatically operable tool according to the preamble of claim 1.

A device for pneumatically actuating a tool according to the preamble of claim 1 and pneumatic pliers are known from EP 1163979 A1.

Pneumatic pliers for pressing and clamping clamping rings, bolts, cable lugs, clamps, etc. are known. In particular, pneumatic pliers are used in the automotive industry, where these pliers are used to tighten clamping rings when assembling hoses, bellows, etc. on connecting pieces, cardan shafts and the like.

The document DE 37 42 782 A discloses pressure medium pliers for spring band clamps with a valve-controlled pressure medium connection and a wedge-shaped pushing member is known. Other such pliers are known from DE 89 00 250 U, DE 195 19 543 A, DE 295 09 976 U and DE 91 11 366 U.

In tools known in the prior art, pressure is applied to a pressure cylinder by actuating a trigger unit. In some cases, the tool or a pressure supply includes an electronic control unit that could unexpectedly apply pressure to the trigger unit and close the tool due to a malfunction. Tools according to the prior art do not have any mechanical safety devices that could interrupt the energy supply (compressed air). If pressure is unexpectedly applied to the trigger unit, for example as a result of a software error, the pliers or their jaws will close. This can lead to dangerous situations. Therefore, various industrial standars ensure that this unexpected closing is avoided. Since a firmware with a simple design according to common standards is never considered completely safe, the trigger unit must be designed in a redundant manner, which is achieved in particular using an electronically redundant control unit.

The invention is based in particular on the problem of providing an alternative to the electronically redundant design of the trigger unit and effectively preventing the tool from causing damage in the event of an unexpected pressure build-up.

The problem is solved by a pneumatic tool with the features of claim 1. Advantageous embodiments of the invention result from the dependent claims.

The invention is based on a pneumatic tool, in particular an electronically controlled pneumatic tool, in which the applied pressure is electronically monitored. The tool comprises a handle, a safety switch lever arranged on the handle for actuating a valve and a pressure medium connection, wherein the valve comprises a valve body movable between a home position and at least one further position, wherein a connection between the pressure medium connection and a pressure cylinder of the tool is interrupted in the home position and the connection between the pressure medium connection and the pressure cylinder of the tool is established in the further position.

The tool may in particular be a pair of pliers, but it is also conceivable to use the invention in other tools.

It is proposed that the pressure cylinder is vented as the valve body is moved to the home position, and a pressure applied to the pressure fluid port moves the valve body to the home position when the safety switch lever is released. The valve is safely returned to the home position by the action of the pressure without manual intervention if the user releases the safety switch lever, for example because he has injured himself. At the same time, the pressure cylinder is vented so that any trapped elements such as fingers or clothing can be safely removed.

In a particularly advantageous embodiment of the invention, the valve body is designed as a sleeve which is displaceable on a pressure supply connection piece and whose inner surface encloses a pressure chamber with an outer surface of the pressure supply connection piece, the two axial end faces of the pressure chamber being formed by inner surfaces of the sleeve and having different surface areas or pressure engagement surfaces. In this way, the desired functionality can be achieved with a ro-bust and compact design.

The different pressure contact surfaces can be realized in a particularly easy manner if an outer diameter of the pressure supply connection piece on a side open towards the pressure cylinder is larger than an outer diameter of the pressure supply connection piece on a side open towards the pressure medium connection. In this case, the axial projections of the inner end faces of the sleeve correspond to the pressure engagement faces in the case of an axially displaceable sleeve.

In a preferred embodiment of the invention, the pressure supply connection piece can in particular comprise a first inner bore open towards the pressure medium connection and a second inner bore open towards the pressure cylinder, as well as first and second, in particular radial, pressure passage bores, the latter in each case connecting the first and second inner bores to the outer surface of the pressure supply connection piece. In the home position, the first through-holes open into the pressure chamber and the second through-holes are released for venting. As a result, the pressure cylinder is vented in the home position. In the further position, the first and the second through-holes open into the pressure chamber, so that the pressure from the pressure medium connection is passed through the first pressure through-holes into the pressure chamber, from there through the second pressure through-holes into the second inner bore and thus to the pressure cylinder.

In a further embodiment, the tool further comprises a spring that generates a restoring force that displaces the valve body to the home position when the safety switch lever is released. The spring can assist the pressure in resetting the valve body, so that even at low pressures (or even without pressure in the system) the valve is transferred to the safe, closed home position. The spring can be designed in such a way that a frictional force of the valve body can always be safely overcome, so that a further redundancy of the safety valve is created.

In other words, the invention proposes to provide a 3/2 way safety valve directly in the trigger unit of the tool according to the invention and thus to prevent the tool or the pliers from closing in case of unexpected pressure build-up and thus injuring persons. The safety valve only releases the pressure passage when necessary.

It is further proposed that the safety valve be operated purely mechanically. This has various advantages, in particular that no additional electronics are required, the space available, which is very limited, is not overloaded, and the grip force that is needed to hold the trigger unit in place can be used.

The invention ensures the compressed air is always interrupted that when the safety lever is not pressed. This corresponds to the safe home position. At the same time, the pressure cylinder of the tool is safely vented in the home position. If the safety switch lever is then pressed, the safety valve is set in such a way that the vent is closed and the pressure can enter the pliers unhindered. In this case, the safety valve should be returned to the safe pressure position without being actuated, so that the tool is automatically locked and vented.

Further features and advantages will be apparent from the following description of the figures. The entire description, the claims and the figures disclose features of the invention in specific embodiments and combinations. The person skilled in the art will also consider the features individually and combine them into further combinations or sub-combinations to adapt the invention, as defined in the claims, to his needs or to specific fields of application.

Figures 2, 3:
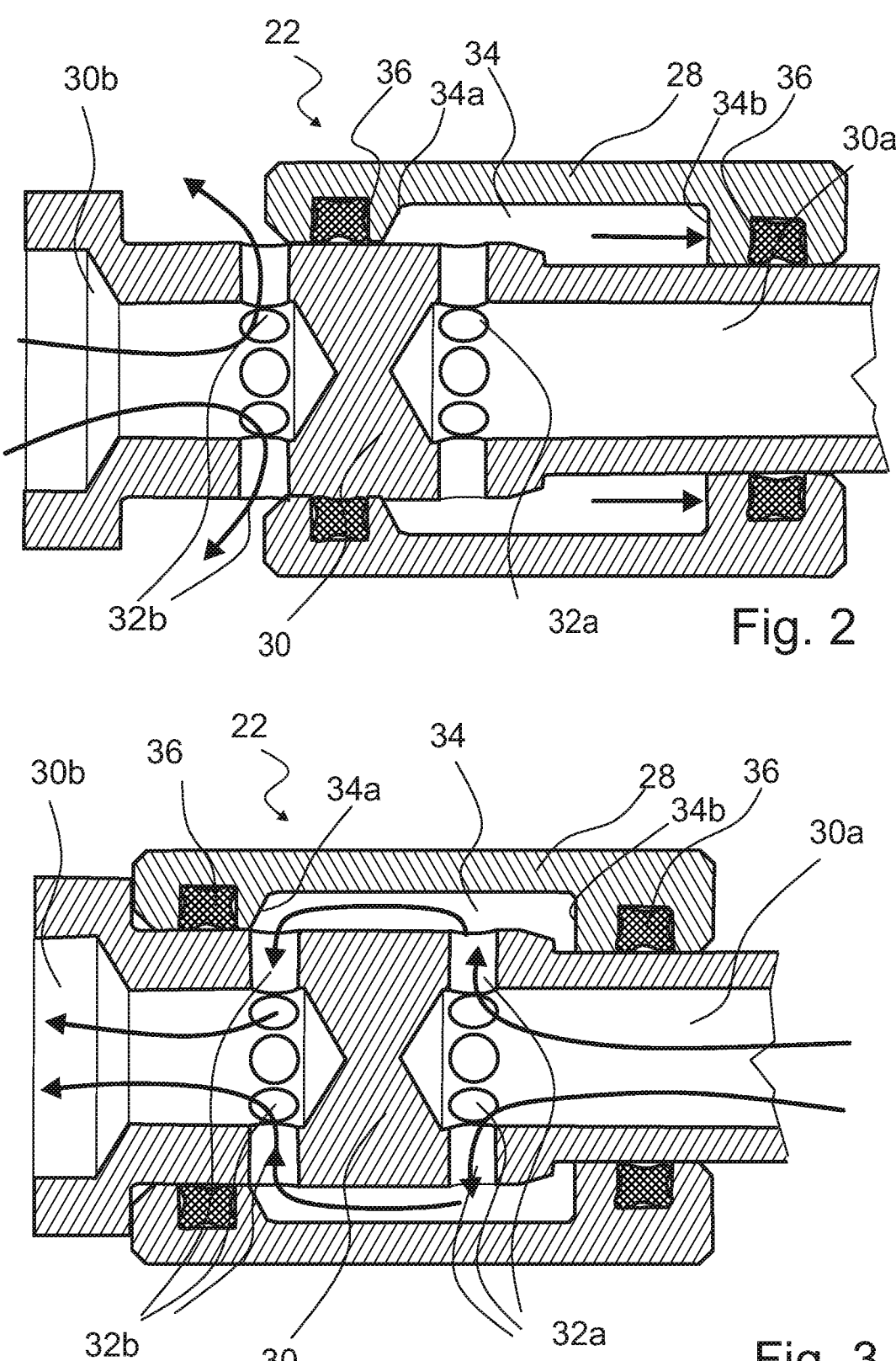
Figures 4A, 4B:
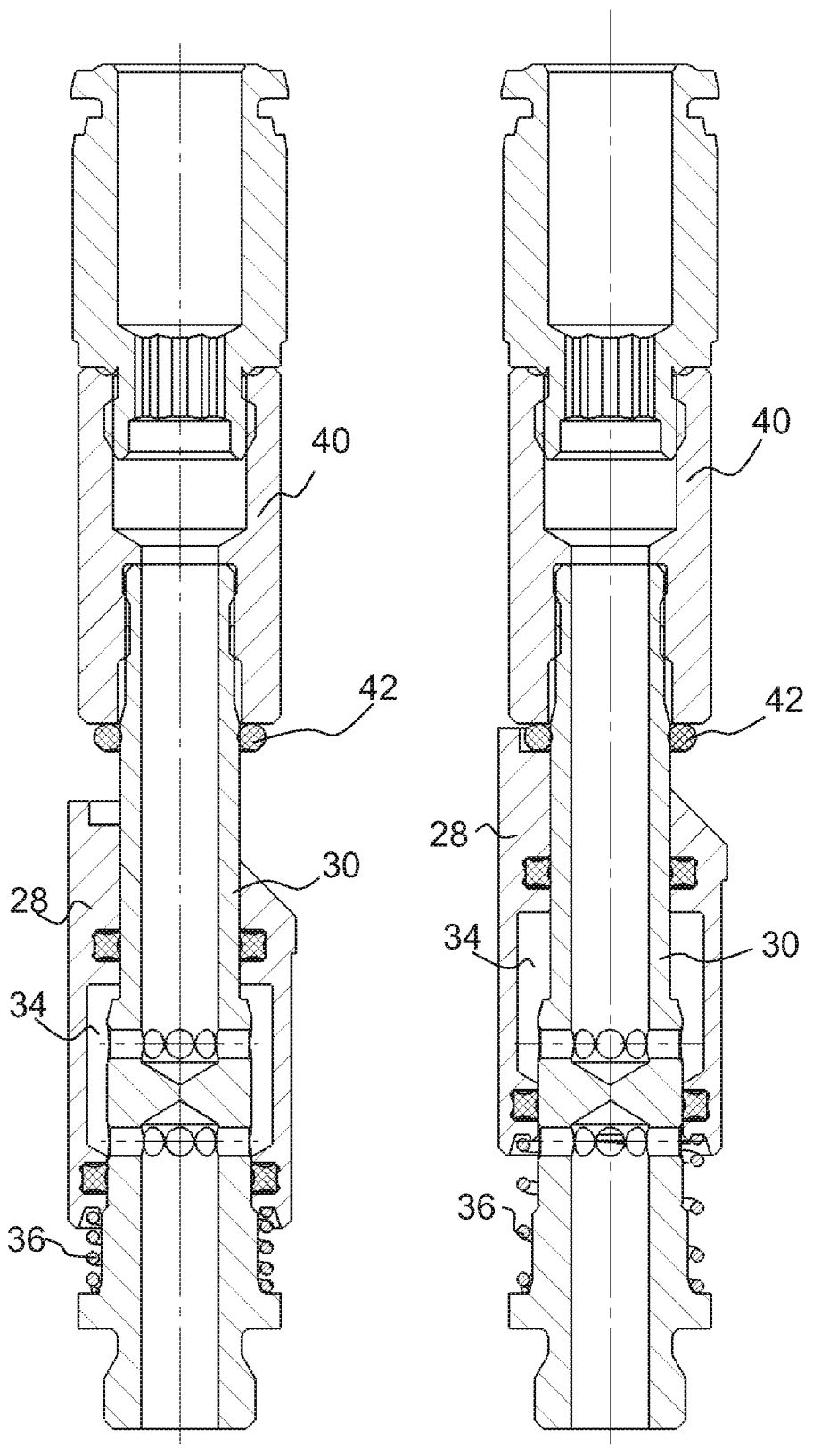
Figures 6A, 6B:
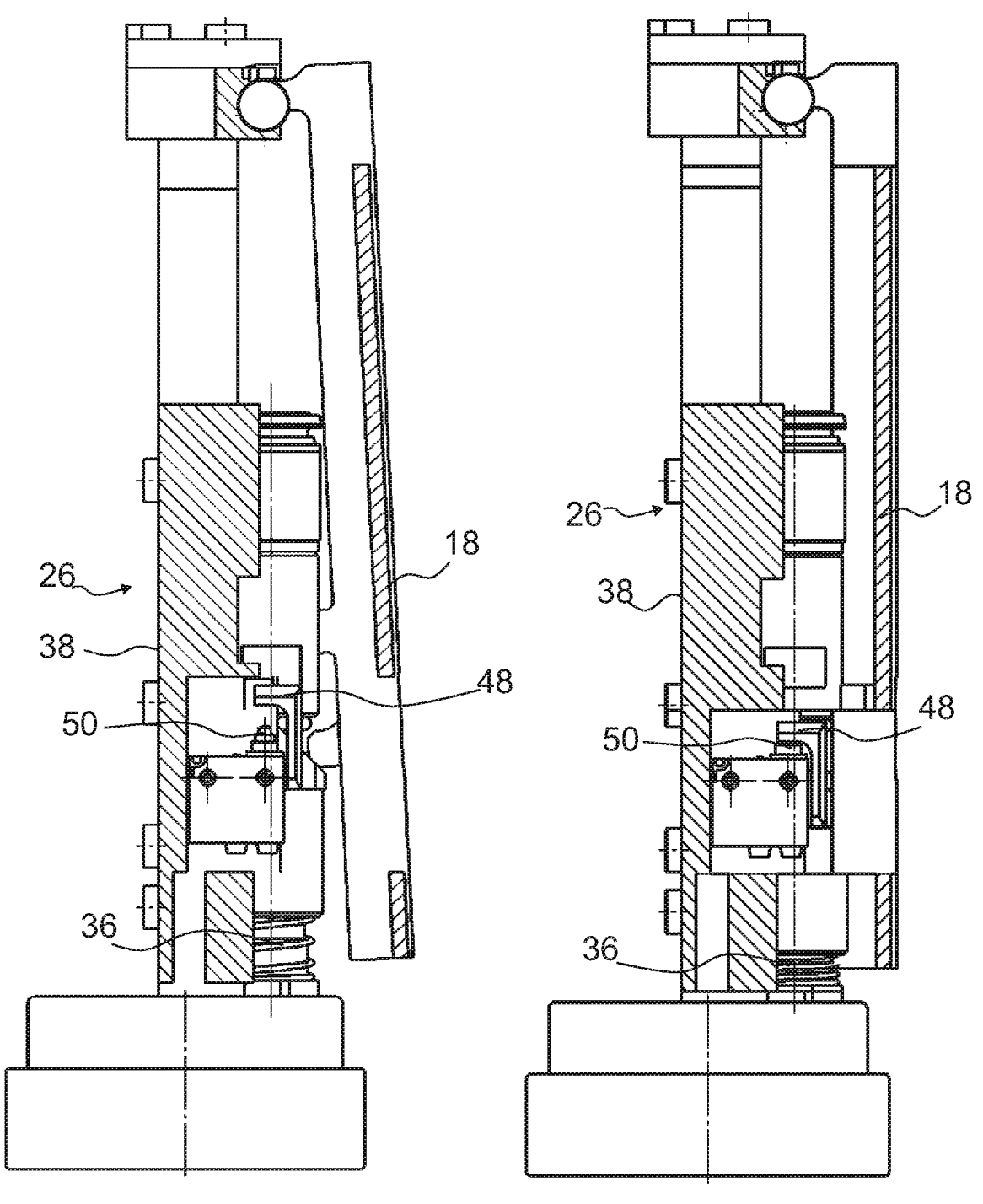

In this regard, the Figures show the following:

FIG. 1 a pneumatic tool designed as pliers according to a first embodiment of the invention;

FIG. 2 a valve of the tool in FIG. 1 in a home position;

FIG. 3 the valve of FIG. 2 in a further position;

FIGS. 4a and 4b the valve of FIGS. 2 and 3 in a wider context;

FIGS. 5a and 5b a first longitudinal section of a handle of a pneumatic tool according to the invention; and FIGS. 6a and 6b a second longitudinal section of a handle of a pneumatic tool according to the invention.

FIG. 1 shows a pneumatic tool 10 in the form of pliers according to a first embodiment of the invention.

The pliers are designed for the installation of pipe clamps, hose bands, clamping rings etc. A plurality of pistons 14 arranged in series or in a row one behind the other are arranged in a pressure cylinder 12.

A pressure medium connection 16 is provided at the rear end of the manually operable pneumatic pliers, by means of which the pliers can be connected to a pressure medium, such as compressed air, via a pressure line (not shown), whereby the pressure medium supply can be opened or the tool 10 can be vented by means of a safety switch lever 18, which actuates a valve 22.

The individual pistons 14 have a passage through the piston rods to allow pressure medium to pass through. In the area of the front end of the piston rods, radially outwardly directed outlet openings are provided. Compressed air can escape through the outlet openings. The next piston 14 is driven forward by the compressed air. The passage of the compressed air through the passage of the next following piston rod is repeated in a similar manner.

The so-called wedge piston 24 follows at the foremost piston 14 in the direction of the pliers tool 20, at the front side of which a wedge-shaped feed member is arranged, for actuating the pliers head or pliers tool 20. By means of the wedge piston 24, driven forward by the pressure medium, the two pliers jaws of the pliers tool 20, which are mounted for example on bolts, are driven apart in the rear portion, in that the wedge surface pushes itself between two rollers. At the same time, the two pincer jaws of the pincer tool 20 are driven together at the front in the closing direction, for example in order to clamp a hose clamp or to press ear clamps or the like by actuating the pincer tool 20.

Furthermore, the pneumatic tool comprises a handle 26 on which the safety switch lever 18 for actuating the valve 22 is arranged. The handle 26 further includes a circuit board with an electronic switching unit 38, which outputs a pressure request signal to the pressure source via the signal line in the pressure line.

FIG. 2 shows the valve 22 in the home position, in which a connection between the pressure fluid port 16 and a pressure cylinder 12 of the tool 10 is interrupted. The valve 22 comprises a valve body 28 formed as a sleeve, which is movably arranged on a pressure supply connection piece 30 between the home position and at least one further position (FIG. 3).

The pressure supply connection piece 30 has a first inner bore 30a open towards the pressure medium connection 16 and a second inner bore 30b open towards the pressure cylinder 12, as well as first and second radial pressure passage bores 32a, 32b. The pressure passage bores 32a, 32b connect the first or second inner bore 30a, 30b with the outer surface of the pressure supply connection piece 30, respectively. In the home position shown in FIG. 2, the first pressure passage bores 32a open into a pressure chamber 34 of the valve 22 and the second pressure passage bores 32b are opened for venting.

When the valve body 28 is moved to the home position, the pressure cylinder 12 can therefore be vented via the second pressure passage bores 32b.

The inner surface of the valve body 28, which is designed as a sleeve and can be displaced on the pressure supply connection piece 30, encloses the pressure chamber 34 with an outer surface of the pressure supply connection piece 30, the two axial end faces 34a, 34b of the pressure chamber 34 being formed by inner surfaces of the sleeve and having different surface areas. The different surface areas result in different pressure forces acting in opposite directions and a resulting force which acts in the direction of the end face 34b with the larger surface area, i.e. to the right in FIGS. 2 and 3, and displaces the valve body 28 in the direction of the home position. A pressure applied to the pressure medium connection 16 therefore shifts the valve body 28 to the right toward the home position when the safety switch lever 18 is released in the orientation shown in FIGS. 2 and 3, without any further force having to be applied to the valve body 28 by the user or otherwise.

Sealing rings 36 are provided on the inner edges of the end faces 30a, 30b of the valve body 28 facing the outer surfaces of the pressure supply connection piece 30 to seal the pressure chamber 34. In particular, the use of lip seals with an X-profile, i.e. X-rings or quad-rings, has the advantage of low static friction and dynamic friction.

Accordingly, the valve 22 is safely set to the home position (FIG. 2) by the action of the pressure without manual intervention when the user releases the safety switch lever 18, for example because he has injured himself. At the same time, the pressure cylinder 12 is vented so that any trapped elements such as fingers, clothing or the like can be easily removed.

The different areas are achieved by different outer diameters of the pressure supply port 30, namely in that the outer diameter of the pressure supply port 30 on a side open to the pressure cylinder 12 is larger than an outer diameter of the pressure supply port 30 on a side open to the pressure medium port 16.

The areas with different outer diameters are separated by a step bridged by the sleeve of the valve body 28.

FIG. 3 shows the valve 22 in the further position, in which the connection between the pressure medium connection 16 and the pressure cylinder 12 of the tool is established. In the further position, both the first and second passage bores 32a, 32b open into the pressure chamber 34, thus establishing a pressure connection from the pressure fluid connection 16 to the pressure cylinder 12 via the pressure chamber 34.

By actuating the safety switch lever 18, the valve 22 is actuated and thus opened or moved into the configuration of FIG. 3, whereby the valve body 28 designed as a sleeve is pushed to the left in the view according to FIG. 3. By holding the safety switch lever 18, the valve 22 is held open (FIG. 3). If the safety switch lever 18 is now released, e.g. due to a trapped finger, the valve 22 closes automatically due to the continuing pressure (FIG. 2).

The resulting force used for closing results because the pressurized surfaces are not identical. In the direction of the home position, the annular area is larger, resulting in a residual force for self-closing. This ensures that the valve 22 always closes under pressure.

When pressure is applied, the valve 22 is therefore not bistable like regular 3/2 valves, but monostable.

FIGS. 4a and 4b show the valve from FIGS. 2 and 3 in a larger context. In the embodiment of FIGS. 4a and 4b, a spring 36 is provided that generates a restoring force that shifts the valve body 28 to the home position when the safety shift lever 18 is released and acts in the same direction as the force resulting from the pressure forces. The spring 36 thus supports the pressure forces when the valve body 28 is reset in such a way that the valve 22 is transferred to the safe, closed home position even at low pressures or completely without pressure. However, embodiments without the additional spring 36 are also conceivable.

The pressure supply connection piece 30 is inserted into an adapter piece 40 for connecting a pressure supply hose (with integrated signal line). An axial front end of the adapter piece 40 forms a stop for the valve body 28, where an O-ring 42 is provided to dampen the stop.

FIGS. 5a and 5b show a first longitudinal partial section of the handle 26 of the pneumatic tool according to the invention. The valve body 28 is provided with a slope 44 on which a projection 46 connected to the safety switching lever 18 slides with a corresponding slope. The safety shift lever 18 is pivotally connected to the handle 26 via a joint disposed at the rear end of the handle 26. When gripping the handle 26 with one hand, the user pivots the safety switch lever 18 inwardly from a closed position (FIG. 5a) to an open position (FIG. 5b) and the valve body 28 is pushed over the projection 46 and the slope 44 to the open position.

FIGS. 6a and 6b are a second longitudinal partial section of the handle 26 of the pneumatic tool according to the invention. An angled switching extension 48 attached to the valve body 28 actuates a safety switch 50 disposed in the handle 26, which must be closed in order for the electronic switching unit 38 disposed in the handle 26 to output a pressure request signal to the pressure source via the signal line in the pressure line. When the switching body 28 is moved to the open position, the safety switch 50 is actuated via the switching extension 48 and a contact in the safety switch is closed, thus fulfilling a necessary condition implemented in the logic of the electronic switching unit 38 for triggering the pressure request signal. The switching extension 48 therefore provides a mechanical connection between the valve body 28 and the electromechanical safety switch 50, allowing the electronic switching unit 38 to monitor the valve 22.

LIST OF REFERENCE SIGNS

10 tool
12 pressure cylinder
14 piston
16 pressure fluid connection
18 safety switch lever

20 pliers tool
22 valve
24 wedge piston
26 handle
28 valve body
30 connecting piece
32a, 32b pressure passage holes
34 pressure chamber
36 spring
38 switching unit
40 adapter piece
42 O-ring
44 bevel
46 projection
48 switching extension
50 safety switch

The invention claimed is:

1. A pneumatic tool, comprising:
a handle (26), a valve (22), a safety switch lever (18) disposed on the handle (26) for actuating the valve (22), and a pressure fluid connection (16),
wherein the valve (22) comprises a valve body (28) movable between a home position and at least one further position, wherein a connection between the pressure medium connection (16) and a pressure cylinder (12) of the pneumatic tool is interrupted in the home position and the connection between the pressure medium connection (16) and the pressure cylinder (12) of the tool is established in the at least one further position,
wherein the pressure cylinder (12) is vented with the displacement of the valve body (28) into the home position and a pressure applied to the pressure medium connection (16) displaces the valve body (28) into the home position when the safety switch lever (18) is released, and
wherein the valve body (28) is a sleeve which is displaceable on a pressure supply connection piece (30) and which has an inner surface that encloses a pressure chamber (34) along with an outer surface of the pressure supply connection piece (30) and two axial end faces (34a, 34b) that are formed by the inner surface of the sleeve and that have different surface areas.

2. A pneumatic tool, comprising:
a handle (26), a valve (22), a safety switch lever (18) disposed on the handle (26) for actuating the valve (22), and a pressure fluid connection (16),
wherein the valve (22) comprises a valve body (28) movable between a home position and at least one further position, wherein a connection between the pressure medium connection (16) and a pressure cylinder (12) of the pneumatic tool is interrupted in the home position and the connection between the pressure medium connection (16) and the pressure cylinder (12) of the tool is established in the at least one further position,
wherein the pressure cylinder (12) is vented with the displacement of the valve body (28) into the home position and a pressure applied to the pressure medium connection (16) displaces the valve body (28) into the home position when the safety switch lever (18) is released,
wherein the valve body (28) is in the form of a sleeve which is displaceable on a pressure supply connection piece (30) and which has an inner surface that encloses a pressure chamber (34) with an outer surface of the pressure supply connection piece (30), wherein an outer diameter of the pressure supply connection piece (30) on a side open towards the pressure cylinder (12) is larger than an outer diameter of the pressure supply connection piece (30) on a side open towards the pressure medium connection (16).

3. A pneumatic tool, comprising:

a handle (26), a valve (22), a safety switch lever (18) disposed on the handle (26) for actuating the valve (22), and a pressure fluid connection (16), wherein the valve (22) comprises a valve body (28) movable between a home position and at least one further position, wherein a connection between the pressure medium connection (16) and a pressure cylinder (12) of the pneumatic tool is interrupted in the home position and the connection between the pressure medium connection (16) and the pressure cylinder (12) of the tool is established in the at least one further position, wherein the pressure cylinder (12) is vented with the displacement of the valve body (28) into the home position and a pressure applied to the pressure medium connection (16) displaces the valve body (28) into the home position when the safety switch lever (18) is released, wherein the valve body (28) is in the form of a sleeve which is displaceable on a pressure supply connection piece (30) and which has an inner surface that encloses a pressure chamber (34) with an outer surface of the pressure supply connection piece (30), wherein the pressure supply port (30) comprises a first inner bore (30*a*) open to the pressure fluid port (16) and a second inner bore (30*b*) open to the pressure cylinder (12), and first and second pressure passage bores (32*a*, 32*b*), which respectively connect the first or second inner bore (30*a*, 30*b*) to the outer surface of the pressure supply connection piece (30), wherein, in the home position, the first pressure passage bores open into the pressure chamber (34) and the second pressure passage bores (32*b*) are released for venting, and, in the further position, the first and the second pressure passage bores (32*a*, 32*b*) open into the pressure chamber (34).

4. The pneumatic tool according to claim 1, further comprising a spring (36) which generates a restoring force which displaces the valve body (28) to the home position when the safety switch lever (18) is released.

5. The pneumatic tool according to claim 1, further comprising an electric or electronic switching unit (38) with an electromechanical safety switch (50) mechanically connected to the valve body (28).

6. The pneumatic tool according to claim 2, further comprising a spring (36) which generates a restoring force which displaces the valve body (28) to the home position when the safety switch lever (18) is released.

7. The pneumatic tool according to claim 2, further comprising an electric or electronic switching unit (38) with an electromechanical safety switch (50) mechanically connected to the valve body (28).

8. The pneumatic tool according to claim 3, further comprising a spring (36) which generates a restoring force which displaces the valve body (28) to the home position when the safety switch lever (18) is released.

9. The pneumatic tool according to claim 3, further comprising an electric or electronic switching unit (38) with an electromechanical safety switch (50) mechanically connected to the valve body (28).

* * * * *